United States Patent [19]
Koeber

[11] 3,981,423
[45] Sept. 21, 1976

[54] TWO SPEED PLANETARY GEAR TRAIN

[75] Inventor: Henry Jacob Koeber, Deerfield, Ill.

[73] Assignee: Bell & Howell Company, Chicago, Ill.

[22] Filed: Apr. 17, 1975

[21] Appl. No.: 568,879

[52] U.S. Cl. .................................. 226/42; 226/44; 226/117
[51] Int. Cl.² ........................................ B65H 23/22
[58] Field of Search ............. 352/180, 181, 182, 14; 226/42, 44, 117

[56] References Cited
UNITED STATES PATENTS

| | | |
|---|---|---|
| 1,900,555 | 3/1933 | Heisler ............................ 352/14 UX |
| 3,244,469 | 4/1966 | Hennessey ............................ 352/14 |
| 3,901,590 | 8/1975 | Ashida ............................ 226/44 X |

Primary Examiner—Richard A. Schacher
Attorney, Agent, or Firm—John E. Peele, Jr.

[57] ABSTRACT

A motion picture camera having a capability of recording sound on film simultaneously as the film passes the image recording station, is improved by the use of a single drive motor which powers film moving mechanisms at both stations. A novel speed change assembly is used to vary the drive of the film through the image recording station in response to the condition of a film loop between the stations as detected by a mechanical sensor which controls the speed change assembly.

8 Claims, 6 Drawing Figures

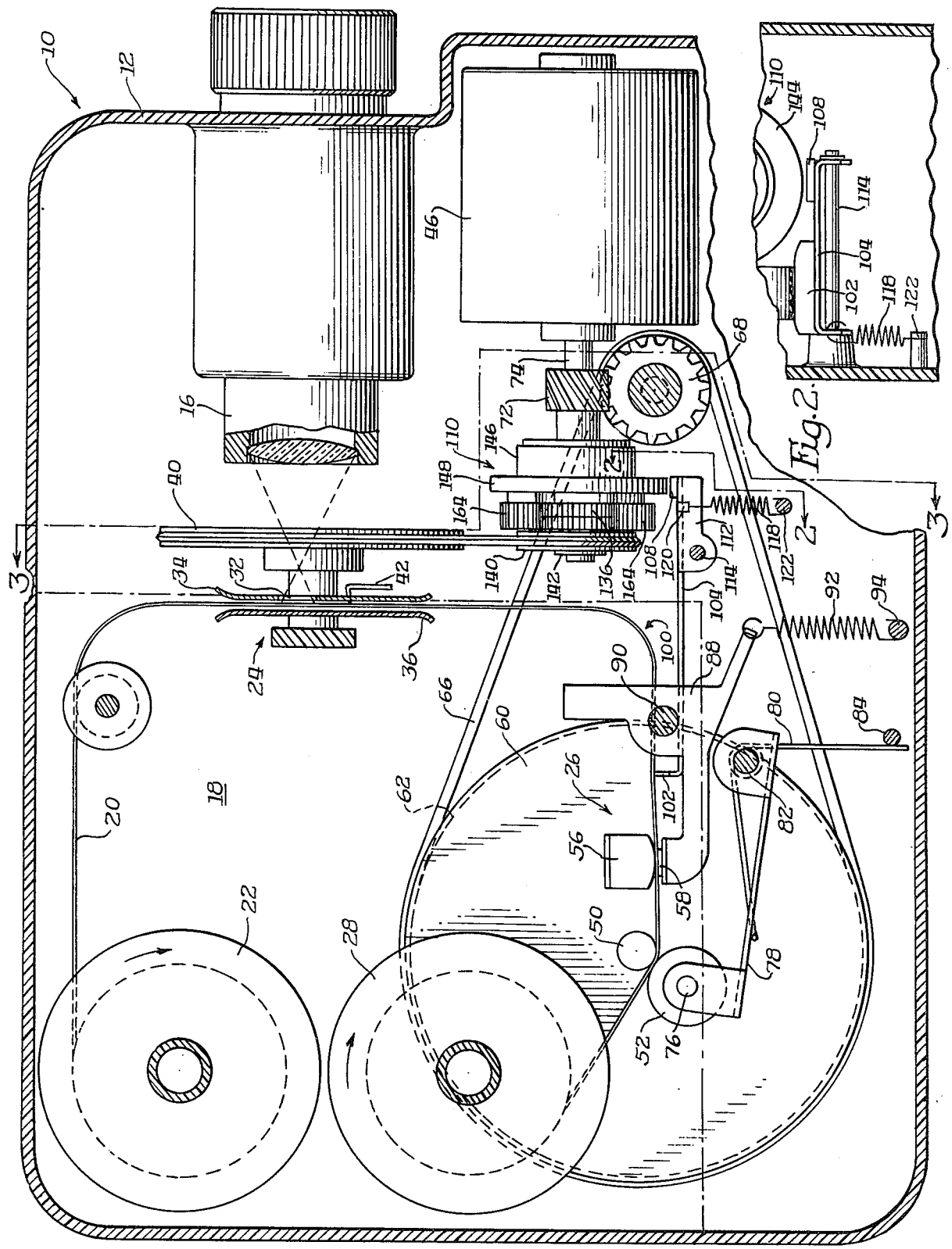

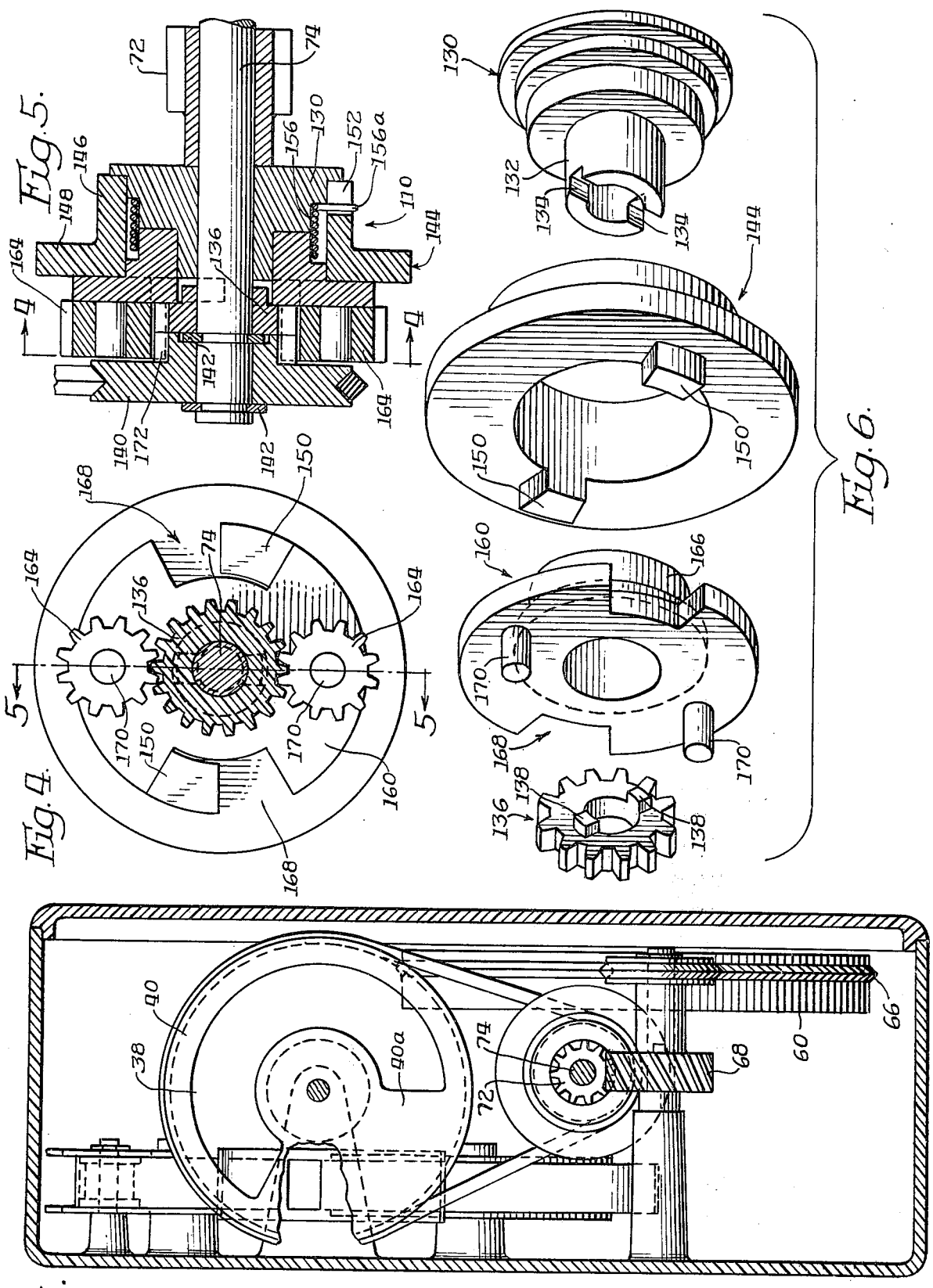

TWO SPEED PLANETARY GEAR TRAIN

The present invention relates to a motion picture camera for handling film on which sound signals are recorded as the picture is imaged thereon. Particularly, the invention relates to an assembly for controlling the output of a single motor to cause the rate of movement of film past the exposure aperture to correspond to the constant rate of transport of the film through the sound station.

Motion picture cameras for amateur or home use having the capability of recording sound simultaneously with pictures are becoming more popular. Most of these cameras have a sound station spaced along a film path from the picture imaging station. These cameras accept film having a magnetic stripe extending longitudinally along one edge on which sound is to be recorded simultaneously with the picture. Since the film transport shuttle at the imaging station of the camera is operated intermittently and the transport at the sound transducing station is operated constantly, two motors have been required. The motor for driving the capstan at the sound station is driven at a predetermined constant rate to cause a smooth movement of the film thereby. Since sound variations are more apparent than small visual variations, corrections to maintain sound to picture synchronization are made to the picture rather than the sound. However, relatively complex electronic circuitry or mechanical mechanisms are usually required to control the motor driving the shuttle to maintain the rate of film movement at a rate similar to the rate of film movement at the sound station. These comparative rates of film motion through the exposure and sound stations are necessary to provide for "lip-synchronization" of sound to picture. That is, since the stations are displaced from one another and the sound is recorded simultaneously with the picture, the film must pass both stations at a predetermined interval to enable the sound to be recorded precisely at the time action occurs.

To accomplish the desired degree of precision, existing cameras have necessitated that two motors of higher than usual quality and therefore greater cost be used. Further, relatively complex mechanisms and/or circuits are required to control the shuttle drive motor to maintain the rate of film movement through the exposure station at the same rate as the film is moved through the sound station. In addition to the added cost of the additional motor and control mechanism and/or circuitry, the dimensions of the camera are necessarily larger than a non-sound camera in order to enclose these added components.

The present invention relates to a motion picture camera having sound-on-film recording capability. The film is transported past both the image and sound recording stations by mechanisms powered by a single motor. A mechanical speed change mechanism couples the motor to the shuttle to control the rate of film transport while permitting the motor to drive the capstan at the sound station at a constant rate. The speed change mechanism varies the rate of the shuttle within a small percentage or frame per second difference depending upon the quantity of film transported through the sound station. That is, the film of a given format, in this preferred embodiment "Super 8," is driven past the sound station at a regulated 18 frames-per-second. Effectively, the film is driven past the exposure aperture in the image recording station at the same rate although the speed change mechanism provides for alternatively transporting the film at 19 frames-per-second and at 17 frames-per-second. By a sensor actuated by a film loop between the image and sound stations, the exact condition of the loop is determined and modified as required. Should the film loop become larger than desired, the sensor actuates the speed change assembly to decrease the rate of film movement through the picture aperture. After the loop returns to the desired size, the assembly increases the speed of the film transport at the image station until another variation occurs in the loop size. The relatively low cost, mechanical speed change assembly can be enclosed in a small area of the camera housing. Since a single motor is required, the cost and size of the resulting camera are reduced although the required precision of the film drive past the stations is maintained.

An object of the invention is to provide for a motion picture camera having a sound recording station and a single motor mechanism drive for transporting film with precision through both the image and sound recording stations.

Another object is to provide a speed change assembly which operates with an extraordinarily smooth rate change in response to actuation by a relatively sensitive loop sensor responding to small variations in film loop size.

The above and other objects of the invention will be more apparent from the following description when considered together with the accompanying drawings, in which FIG. 1 is a schematic elevational view of the pertinent components of a sound camera incorporating the invention, with parts removed and parts in section for clarity;

FIG. 2 is a detailed view of the loop sensor taken along section line 2—2 of FIG. 1;

FIG. 3 is a sectional view of the mechanism taken along section line 3—3 of FIG. 1;

FIG. 4 is an enlarged end view in partial section of the speed change assembly taken along section line 4—4 of FIG. 5;

FIG. 5 is a section view of the speed change taken along section line 5—5 of FIG. 4; and FIG. 6 is an exploded perspective view of the principle components of the speed change assembly.

As shown in FIG. 1, a motion picture camera 10 has a housing 12 on which is supported an objective lens 16. Enclosed within the housing is a film chamber 18 in which a film 20 is transported from a supply, shown as reel 22, past an exposure station 24, past a sound station 26, and onto a take-up, shown as reel 28. Although the film is shown as being transported between separate reels, the film chamber may accept a film cartridge, such as the type in which Super 8 film is supplied from a first spool or hub to a second co-axial spool or hub within the same casing.

The film exposure station 24 is generally of known construction with an aperture 32 formed in an aperture plate 34 through which an image of a scene can be imaged on the film 20 held in position either by a camera pressure plate 36 or the pressure plate built into the cartridge. Light rays forming the scene image are imaged by the objective lens 16 through an opening 38 in a shutter 40. A shuttle device 42 has a film perforation engaging tooth to transport film to and from the exposure station in synchronism with the shutter 40 which is rotatably driven in this preferred embodiment. That is, the shuttle intermittently positions the film frame by frame in the exposure station while the shutter opening permits light rays to impinge on the film. After an exposure and as the light blocking segment 40a of the shutter passes the aperture, the film is transported past the aperture by the length of one frame.

The shutter 40 and the shuttle 42 are synchronously driven by a motor 46 powered by a not shown energy source, such as batteries. Through transmission components, not shown, the motor drives the take-up with a tendency to wind up a length of film at a rate slightly in excess of the rate at which film is transported past the exposure aperture 32. Should silent film be exposed in the camera rather than sound film, either the sound station is deactivated or the film path may bypass that station, and a constant rate drive is applied to the shutter and shuttle for transporting the film past the exposure aperture and onto the take-up.

The sound station 26 includes a capstan 50 arranged to one side of the film path opposite a pressure roller 52. Together the capstan and pressure roller frictionally pull the film past a sound transducing head 56 arranged opposite a pressure pad 58 on the other side of the film path. Drive to the capstan is transmitted through a co-axially arranged flywheel 60 having a pulley receiving groove 62 about its periphery. The belt pulley 66 is driven by a helically geared pulley wheel 68 which is arranged to engage a helical gear 72 fixed to the driven shaft 74 of the motor 46. The motor shaft speed, the worm gear, and the pulley drive are selected to cause the capstan to drive the film at a predetermined constant rate. In this preferred embodiment, the rate selected equals 18 frames per second of film. The rate of film transport is maintained constant by the pull due to the film being held against the capstan by the pressure roller which is freely rotated about an axle 76 supported in an end of a support lever 78. A tension spring 80 is wound on the shaft 82 about which the lever is supported for pivotal movement, to continuously bias the pressure roller toward the capstan. This spring has one end engaging the lever 78 and another end engaging a stop 84 fixed to a not shown mechanism support plate of the camera. The lever and the pressure roller are pivoted away from capstan engagement by mechanism not shown when the film chamber is opened to remove or insert a film supply.

The pressure pad 58 for holding the film 20 against the transducing head 56 is carried on an arm of a link member 88 mounted for pivotal movement about a support shaft 90. A coiled spring 92 is coupled to another arm of the link member to bias the pressure pad against the head with a predetermined force sufficient to insure intimacy between the head and the magnetic stripe along the film. The other end of the spring 92 is attached to a lug 94 fixed to the mechanism support plate within the housing of the camera. This pressure pad is coupled with the pressure roller to open the film path for insertion and removal of film.

Intermediate the exposure station and the sound station, the film path forms a film loop 100 which is modified as necessary to maintain the length of film between the stations within relatively accurate limits. Changes in the length of the loop are caused by the differences between the constant rate at which the film is pulled continuously through the sound station and the intermittent rate at which the film is transported past the exposure station. To translate the condition of the loop to the speed change assembly, a sensor 102 forming an end of an elongated lever 104, is arranged to be engaged and moved by the loop. Through movement of the elongated lever, the position of a speed change assembly actuator 108 on the other end of the lever is displaced into engagement with a component of the speed change assembly 110. The lever is formed preferably with a bent over ledge 112 having an axle receiving opening therein through which a pivot axle 114 passes. A spring 118 is connected to a lug 120 on the lever and a fixed pin 122 to urge the sensor end of the lever toward the film while urging the assembly actuator end away from the assembly. By the selection of the relatively long and short leverage arms of the lever in relation to the pivot about axle 114, a small amount of force by the film loop 100 is amplified to apply adequate force to the speed change assembly while an equally small drag force is applied to the film. Further, an unexpectedly sensitive arrangement occurs since little film motion is required, and speed changes can occur during any instant covering only a few frames of film.

Referring now to FIGS. 4, 5, and 6, the speed change assembly 110 is shown in more detail. On the motor shaft 74, beyond the worm gear 72, is fixed a multiple diameter drive bushing 130 having in the axial end of the smallest diameter portion 132 a pair of diametrically opposed slots 134. Spaced axially along the motor shaft is a small drive gear 136 having a pair of diametrically opposed lugs 138 formed on the face adjacent the drive bushing 130. Through the engagement of the drive gear lugs in the notches of the bushing, the drive gear is driven continuously. About the end of the shaft remote from the motor, the shutter drive pulley wheel 140 is supported on the shaft for rotation thereabout. A pair of retaining rings 142 are seated in spaced grooves formed in the shaft to prevent axial movement of the pulley wheel along the shaft.

The speed change assembly includes a braking disc 144 which is arranged on one shelf of the bushing 130. The L shaped braking disc 144 has the base portion 146 thereof in engagement with the shelf of the bushing and the upright portion 148 extending radially beyond the periphery of the largest diameter of the bushing. From the forward face of the braking disc extends a pair of lugs 150 of a predetermined arcuate dimension. A cut-out 152 is formed in the base portion 146 of the braking disc to receive an end leg 156a of a coiled one way clutch spring 156 which is wound about another shelf of the bushing 130 and a drivable disc 160. The drivable disc for supporting a pair of planetary idler gears 164 includes a support ledge 166 about which the coiled spring may wind tight. That is, when the braking disc 144 is not restrained, the spring end 156a engaged in the notch 152 causes the spring to wind tight about the bushing and the drivable disc. During this time, the drive to the drivable disc occurs through lugs 150, which engage a pair of relief cut-outs 168 formed in the periphery of the drivable disc. The relief cut-outs are dimensioned approximately twice the predetermined arcuate dimension of the lugs to permit relative movement of the disc with respect to one another.

The planetary idler gears 164 are mounted for rotation about a pair of stub shafts 170 spaced diametrically apart on and extending from the face of the drivable disc 160 remote from the braking disc 144. These planetary idler gears are arranged in mesh with and driven as an assembly by the small drive gear 136. Also, they are in mesh with a gear ring 172 formed on the interior periphery of the pulley wheel 140. The number of the teeth on the drive gear and the pulley wheel differ by 2 to provide the desired 1 to 1.111 reduction ratio change in this preferred embodiment. For larger reduction ratios, the idler gears can be formed as compound gears.

Operation of the speed change assembly 110 is controlled by the position of the film loop sensor 102. When an adequate film loop 100 is formed in the film, the actuator end of the sensor lever opposite the braking disc 144 of the assembly is spaced from that disc. While the motor drives the capstan at a predetermined rate through the worm gear and pulley arrangement, the speed change assembly transmits power to the shuttle and shutter assembly at a rate to move film preferably at approximately 18 frames-per-second. As the motor powers the drive shaft 74, the bushing 130 of the speed change assembly drives the small gear keyed thereto, and causes the braking disc to wind the coiled spring to rotate the drivable disc. Since each of these components and the planetary gears are relatively locked and revolve about the axis with the drive gear, the pulley wheel is rotated at a rate to cause the shuttle to transport film at 19 frames-per-second, a rate slightly faster than the 18 frames-per-second capstan rate.

When the size of the film loop 100 increases due to the rate differences, the film engaging end 102 of the sensor 104 is caused to be engaged by the film and to cause the actuator end 108 to engage the braking disc 144 of the speed change assembly 110. The assembly thus causes the shuttle 42 to transport film at a new rate of 17 frames-per-second although the motor continues to drive the capstan at the predetermined speed of 18 frames-per-second. The speed change to the pulley wheel occurs when the braking disc is restrained. The braking action due to engagement of the sensor causes the drag to unwind the spring which was tight about the drivable disc and the bushing. Therefore, drivable disc 160 is no longer positively driven by this spring but instead will slow down or stop rotating as determined by the pressure of the actuator end 108 on braking disc 144. Restraining of the braking disc precludes revolution of the assembly of planetary gears although the gears remain free to rotate about the stub shafts 170. As the planetary gears rotate, they are driven by the small drive gear 136 and in turn, drive the pulley wheel 140. Since the number of teeth on the small gear and on the pulley wheel differ by two teeth, the pulley wheel is driven at a differential speed from the speed which occurs when the speed change assembly is in the free condition. The resulting small variation in the rate at which the shuttle and shutter are operated modifies the film transport rate to cause the film loop to be returned to the desired length. As the sensor releases the braking disc, the speed of the pulley wheel returns to the predetermined speed. By the small speed changes, no motion variation can be appreciated for most subjects, during projection which is at a constant speed. Further, the images of constantly moving subjects, such as when the subject is anticipated to move smoothly to the next position, are not apparent since the average rate is 18 frames-per-second, and the changes between 19 and 17 frames occur quickly.

An alternative embodiment incorporating the principle of the invention is a more simplified speed change assembly. The drivable disc 160 and the braking disc 144 are combined into an integral disc member eliminating the requirement for the clutch spring member. This restrainable member, held against axial movement, is frictionally supported on the motor drive shaft. A pair of stub shafts are arranged diametrically on the restrainable disc member with each supporting an idler gear for rotation. A drive gear is fixed to the drive shaft and is in mesh with the idler gears, as is the geared pulley wheel.

This modified speed change assembly is controllable by the film loop sensor in the same manner as described with respect to the preferred embodiment. The motor drives the assembly to rotate as a unit with the idler gear assembly revolving when the restrainable member is unrestrained. However, when the disc member is restrained, the idler assembly is precluded from revolving thereby causing rotation of the idler gears to reduce the rate of rotation of the pulley wheel.

While the invention has been disclosed in preferred embodiments, it is understood further changes and modifications can be made without departing from the scope of the disclosure.

What is claimed is:

1. An improvement in a motion picture camera having an image recording station past which film is moved intermittently and spaced therefrom, a sound recording station past which the film is moved constantly, the film path between the stations including a film loop, the improvement comprising:
   a single motor for driving the film through both said stations;
   a film moving mechanism at said sound recording station;
   a constant speed transmission coupling said motor to said film moving mechanism at said sound recording station;
   a speed change assembly coupling said motor to said film moving mechanism at said image recording station;
   said speed change assembly including a braking disc having fixed thereto at least a pair of stud shafts about each of which an idler gear is rotatable, said idler gears being nonrotatably revolved on said braking disc when said braking disc is unrestrained, and being non-revolvably rotated when said braking disc is restrained; and
   film loop sensor means for selectively engaging said braking disc of said speed change assembly to affect the rate of operation of said film moving mechanism at said image recording station, whereby said film moving mechanism is operated at a first rate when said braking disc is unrestrained and at a reduced rate when said braking disc is restrained.

2. The film loop sensor means as in claim 1 comprising an elongated lever arranged to engage said film loop and said speed change assembly and being pivoted nearer one end than the other to provide relatively large frictional forces at the short end for engaging said assembly responsive to relatively small forces on the long end when engaged by said film loop
   whereby the rate of operation of said film drive mechanism at said image recording station is varied responsive to said film loop to transport film at a rate corresponding to the rate at which said film is transported past said sound recording station.

3. The speed change assembly as in claim 1 including a shaft driven by said motor and wherein said braking disc controls revolution of said pair of planetary idler gears being revolvably rotated when said braking disc rotates and being held against revolution when said braking disc is restrained.

4. A speed change assembly as in claim 1 wherein said film moving mechanism at said image recording station alternatively moves said film at a different rate from the rate of said film moving mechanism at said sound recording station, the rates of said mechanism at said image recording station being averaged to said rate of film movement at said sound recording station.

5. In a motion picture camera having an image recording station and a sound recording station, the mechanism for transporting film through both stations being powered by a single motor, a speed change assembly interposed between the motor and the film transport mechanism at one of said stations, the assembly comprising:
 a bushing fixed to the motor shaft;
 a drive gear fixed to said shaft;
 a drivable disc means supported on said bushing;
 an output means coupled to said film transport means at said one station and having gear portions thereon; and
 at least a pair of idler gears supported on said drivable disc means for rotation, said idler gears meshing with said drive gear, and said gear portion of said output means
 whereby said assembly operates said station at a first rate when said drivable disc means runs free and at a second rate responsive to braking of said drivable disc means.

6. The speed change assembly as in claim 5 further including:
 spring clutch means for driving said drivable disc means when said disc means is unrestrained, and releasing said drivable disc means for positive drive when said disc means is restrained.

7. A speed change assembly as in claim 5 including:
 at least a pair of stub shafts on said drivable disc about which said idler gears are rotatable, said idler gears being non-rotatably revolved by said drivable disc when said disc is unrestrained, and being non-revolvably rotated when said drivable disc is restrained.

8. A speed change assembly as in claim 5 wherein said drivable disc and said braking disc are couplable by lug means and lug receiving means for positive drive of said drivable disc by said braking disc.

* * * * *